United States Patent [19]

Dial et al.

[11] E Re. 30,146

[45] Reissued Nov. 13, 1979

[54] FLOATING COVER FOR A LIQUID STORAGE RESERVOIR

[75] Inventors: Howard S. Dial; Henry L. Habegger, both of Placentia; William B. Kays, Whittier, all of Calif.

[73] Assignees: Howard D. Webb; Arthur M. Lockhart, both of Long Beach, Calif.

[21] Appl. No.: 973,371

[22] Filed: Dec. 26, 1978

Related U.S. Patent Documents

Reissue of:

[64] Patent No.: 3,313,443
Issued: Apr. 11, 1967
Appl. No.: 378,469
Filed: Jun. 26, 1964

[51] Int. Cl.[2] ..... B65D 87/18

[52] U.S. Cl. ..... 220/219; 4/172.12

[58] Field of Search ..... 220/216–227, 220/85 B; 405/53–59; 4/172.12–174.14

[56] References Cited

U.S. PATENT DOCUMENTS

| | | | |
|---|---|---|---|
| 1,493,091 | 5/1924 | Wiggins. | |
| 1,580,194 | 4/1926 | Glass | 220/227 |
| 1,734,623 | 11/1929 | Griffin. | |
| 1,819,401 | 8/1931 | Bailey. | |
| 1,874,726 | 8/1932 | Wiggins. | |
| 1,902,108 | 3/1933 | Twogodd. | |
| 1,909,484 | 5/1933 | Bjerregaard | 220/219 X |
| 2,014,264 | 9/1935 | Patrick. | |
| 2,036,372 | 4/1936 | Stough. | |
| 2,211,958 | 8/1940 | Mahaffey | 405/53 X |
| 2,281,748 | 5/1942 | Carney. | |
| 2,287,213 | 6/1942 | Wiggins. | |
| 2,307,508 | 1/1943 | Jayne. | |
| 2,337,010 | 12/1943 | Wiggins. | |
| 2,461,537 | 2/1949 | Feild. | |
| 2,497,850 | 2/1950 | Allen | 220/225 |
| 2,538,032 | 1/1951 | Orr et al.. | |
| 2,715,231 | 8/1955 | Marston. | |
| 2,815,809 | 12/1957 | Jacobs et al. | 4/172 |
| 2,867,346 | 1/1959 | Champagnat | 220/217 |
| 2,873,042 | 2/1959 | Find. | |
| 2,914,776 | 12/1959 | Hutz | 4/172 |
| 2,970,716 | 2/1961 | McCammon | 220/219 X |
| 2,986,302 | 5/1961 | Paulet | 220/218 |
| 3,026,538 | 3/1962 | Boyd et al. | 4/171 |
| 3,028,040 | 4/1962 | Woodard et al. | 220/85 B |
| 3,063,062 | 11/1962 | Logan | 4/172 |
| 3,072,920 | 1/1963 | Yellott | 220/216 X |
| 3,079,030 | 2/1963 | Moyer | 220/218 |
| 3,120,320 | 2/1964 | Wissmiller | 220/225 |
| 3,184,764 | 5/1965 | West | 4/172 |
| 3,229,309 | 1/1966 | Knudel | 4/172 |

FOREIGN PATENT DOCUMENTS

| | | | |
|---|---|---|---|
| 13780 | of 1928 | Australia | 220/218 |
| 221672 | 11/1957 | Australia. | |
| 888975 | 9/1953 | Fed. Rep. of Germany. | |
| 1154765 | 9/1963 | Fed. Rep. of Germany. | |
| 816440 | 7/1959 | United Kingdom. | |

OTHER PUBLICATIONS

Erdol und Kohle, (Germany: Dec., 1958), p. 876.

Feasibility Study Aimed at Hasty Bulk Fuel Storage Facilities, Southwest Research Institute, San Antonio, Texas, Jun. 28, 1958.

Feasibility Study for Hasty Bulk Fuel Storage Reservoir Final Report, Jun. 28, 1959.

Report No. 1842, U.S. Army Engineer Research and Development Laboratories, Fort Belvoir, Va., Dec., 1965.

*Primary Examiner*—Stephen Marcus

*Attorney, Agent, or Firm*—Fulwider, Patton, Rieber, Lee & Utecht

[57] ABSTRACT

*A floating cover for a liquid storage reservoir to prevent contamination of the stored liquid. The cover includes a continuous sheet of flexible material overlying the liquid and attached to the upper periphery of the reservoir, the area of the sheet being greater than the area encompassed by the upper periphery of the reservoir. The cover further includes floats in the central portion to float it higher than the peripheral portion whereby the excess material in the peripheral portion forms a depending rainwater collection sump.*

10 Claims, 12 Drawing Figures

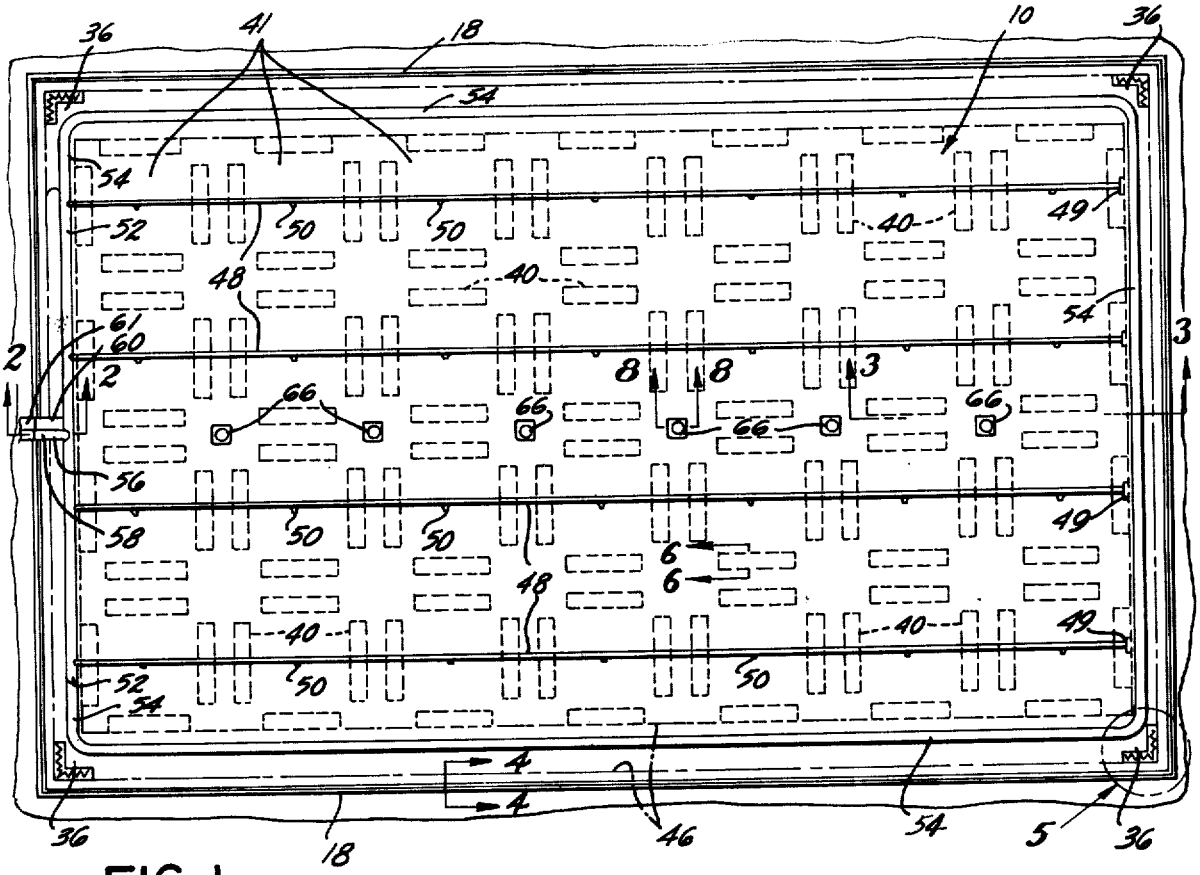
FIG. 1
FIG. 3
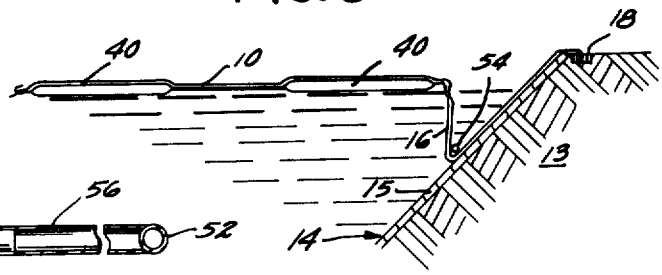
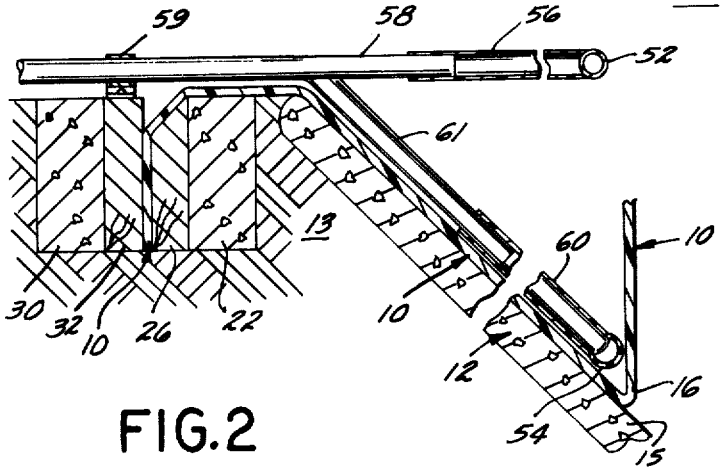
FIG. 2

FIG. 4
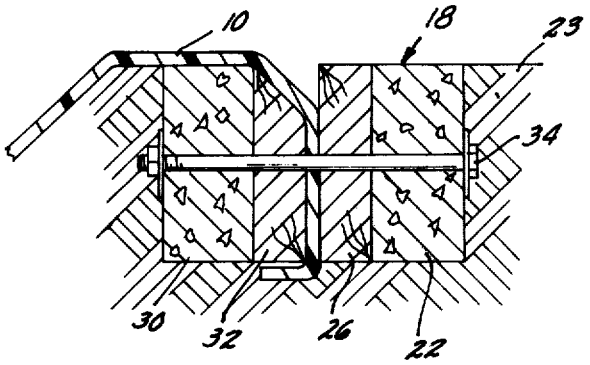
FIG. 5
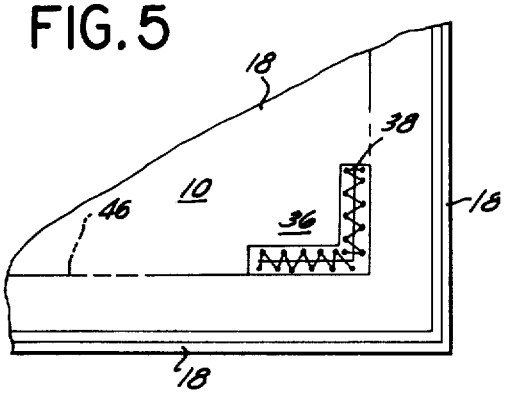
FIG. 6
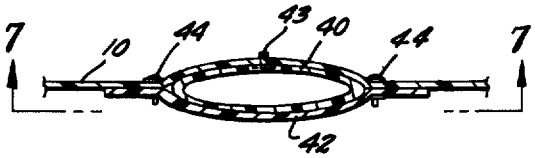
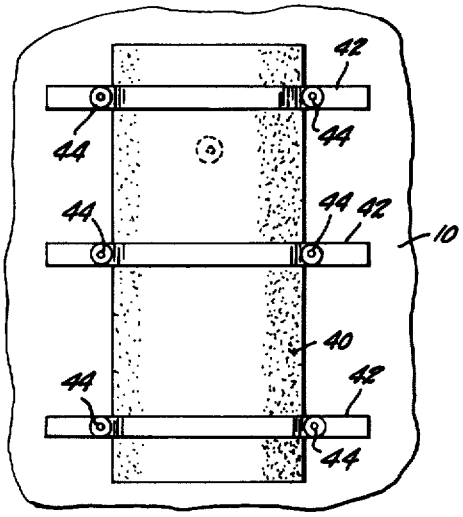
FIG. 7
FIG. 8
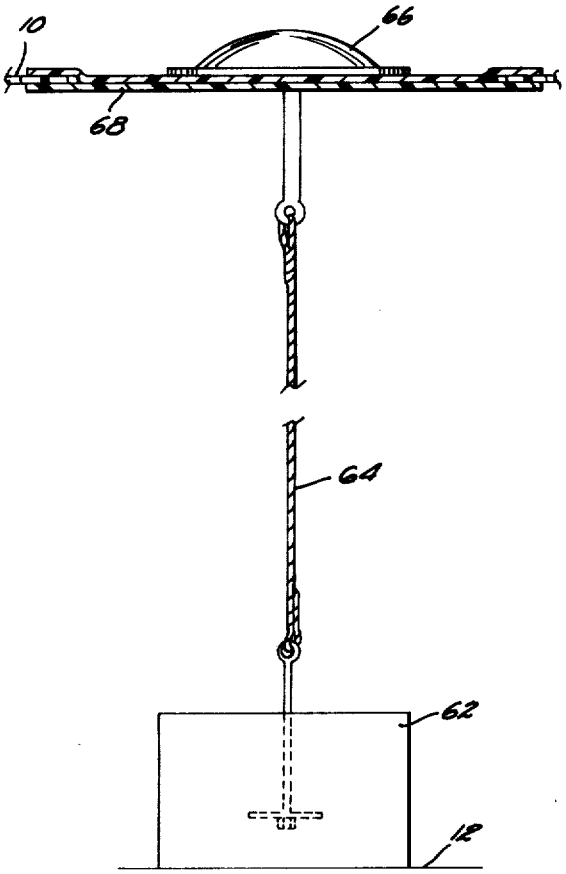

FLOATING COVER FOR A LIQUID STORAGE RESERVOIR

Matter enclosed in heavy brackets [ ] appears in the original patent but forms no part of this reissue specification; matter printed in italics indicates the additions made by reissue.

The present invention relates to a floating cover for a liquid storage reservoir, and more particularly to a floating cover adapted to rise and fall with the level of the stored liquid, according to the consumption and replenishment thereof.

It is an object of the present invention to provide a floating cover which will protect the liquid in a storage reservoir from small animals and birds and from deleterious substances such as dirt, radioactive fallout, and the like, and which is strong enough and sufficiently well supported by flotation means to support relatively heavy loads, such as the weight of snow. The invention is particularly adapted for use in conjunction with conventional water reservoirs characterized by sloping side walls, although it can also be used in conjunction with reservoirs and tanks having vertical walls. Such water reservoirs usually contain large volumes of water and it is important that the cover utilized to protect the water be relatively inexpensive and yet be capable of accommodation to the varying water areas as the water level rises and falls in the slope-sided reservoir.

Another object of the invention is to provide such a floating cover which is adapted to define a drainage and expansion section or sump for concentrating rain water so that it may be periodically removed, as by pumping or the like.

Yet another object of the invention is to provide a floating cover for a water reservoir which is supported upon the surface of the water by a plurality of sets of flotation units, and wherein each set of flotation units defines an unsupported area therebetween which tends to collect rain water. A system of drainage pipes or lines is provided with inlet openings in communication with each of these unsupported areas for removing the collected rain water.

It is also an object of the invention to provide a means for anchoring the floating cover relative to the bottom of the reservoir to constrain the cover against lateral movement, which might occur by virtue of strong winds sweeping laterally across the surface of the reservoir.

Another object of the invention is to provide a floating cover which can be installed in a water reservoir for protection of the stored water without the necessity of removing any of the water therefrom, and which includes a flap or flaps which can be opened to afford access to the underside of the cover and to the interior of the reservoir for maintenance purposes and the like.

A further object of the invention is to provide a floating cover which can be installed in a water reservoir for protection of the stored water without the necessity of removing any of the water therefrom, and which is adapted for support by a plurality of cables or the like disposed therebeneath during emptying of the reservoir for maintenance or repair of the reservoir.

Other objects and features of the invention will become apparent from consideration of the following description taken in connection with the accompanying drawings, in which:

FIG. 1 is a plan view of a floating cover in accordance with the present invention;

FIG. 2 is an enlarged view taken along the line 2—2 of FIG. 1;

FIG. 3 is an enlarged view taken along the line 3—3 of FIG. 1;

FIG. 4 is an enlarged view taken along the line 4—4 of FIG. 1;

FIG. 5 is an enlarged view of the area designated by the numeral 5 in FIG. 1;

FIG. 6 is an enlarged view taken along the line 6—6 of FIG. 1;

FIG. 7 is an enlarged view taken along the line 7—7 of FIG. 6;

FIG. 8 is an enlarged view taken along the line 8—8 of FIG. 1;

Figure 9:
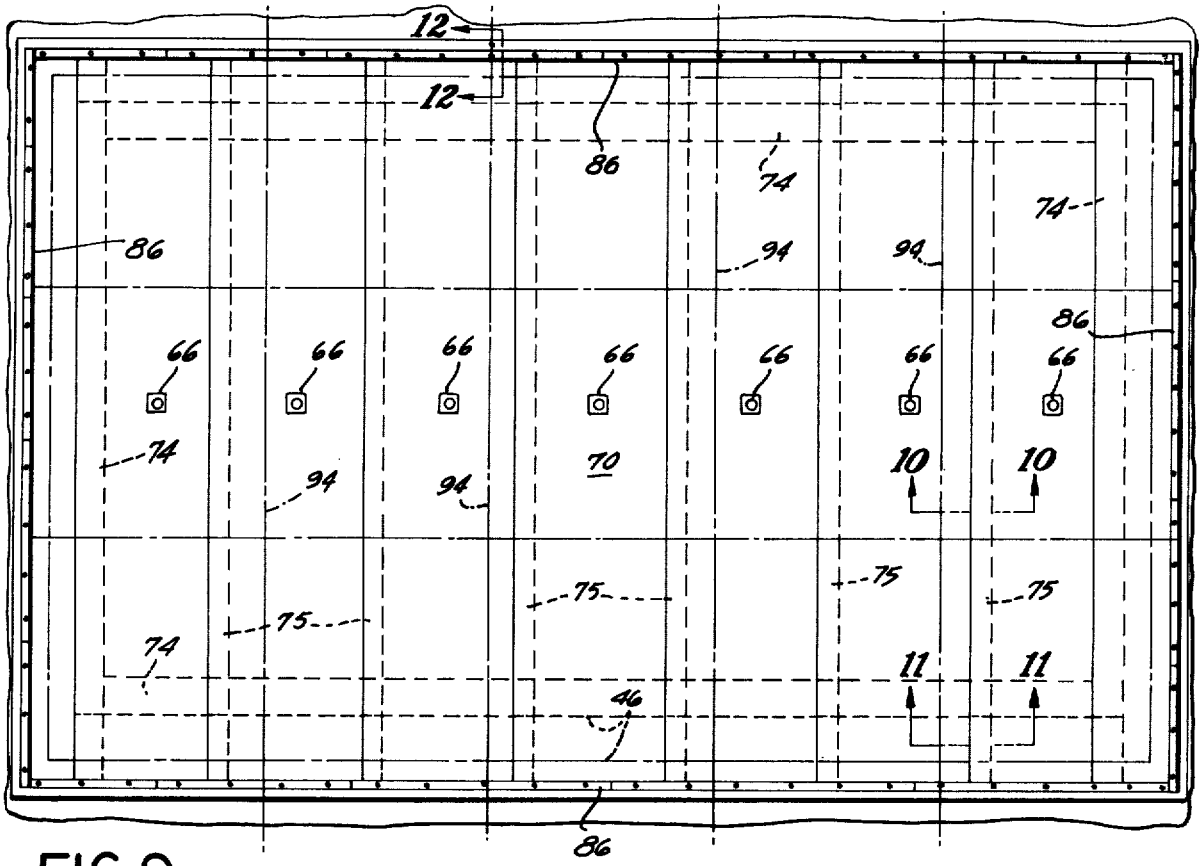
FIG. 9 is a plan view of another form of floating cover in accordance with the present invention.

Referring now to the drawings, the floating cover of the present invention is designated generally by the numeral 10 and is illustrated in association with an earthen reservoir 12 which in the present instance is rectangular in shape. The particular reservoir 12 is characterized by downwardly and inwardly slanting or sloping side walls 14, as best viewed in FIGS. 2 and 3, which are usually formed by a compacted subgrade 13 of earth covered with a relatively thin layer 15 of asphalt of cement treated material.

By virtue of the fact that the reservoir 12 has sloping side walls, the area at the upper extremity or periphery of the reservoir is greater than the corresponding area at the base or bottom of the reservoir and the cover 10 must be adapted to accommodate itself to the difference in area as the level of the water rises and falls according to the consumption and replenishment thereof.

The cover 10 is continuous sheet of material, such as flexible, relatively thin butyl rubber sheeting or vinyl, polyethylene or like film impervious to and adapted to completely overlie the water in the reservoir 12 in coextensive relationship to the reservoir periphery. The sheeting or film is preferably fabric reinforced for improved tear strength. The size or area selected for the cover 10 is such that it is appreciably greater than the area of the reservoir periphery, that is the periphery of the reservoir at its upper extremity. With this arrangement, wrinkles or folds 16 are formed in the cover 10, and tend to develop adjacent the periphery of the reservoir 12 for reasons which will become apparent hereinafter.

The peripheral or free edges of the cover 10 are anchored in position in substantially air and fluid-tight relationship by a peripherally continuous sheet anchor 18 adjacent the uppermost extremity of the reservoir. Any suitable sheet anchor 18 for maintaining the cover 10 in position in substantially fluid-tight relationship is satisfactory. One exemplary form of sheet anchor 18 is illustrated in FIGS. 1, 3, and 4. In this construction, the anchor 18 comprises a fixed portion 22 which extends about the periphery of the reservoir 12 and is conveniently made of concrete firmly embedded in the subgrade 13. Facing elements 26 are arranged coextensive with the fixed portion 22, and are constituted of elongated lengths of timber arranged in abutting relation at their ends. Each anchor 18 also includes a plurality of movable portions which each comprise an elongated concrete block 30 and a coextensive facing element 32 made of a wooden timber or the like. The plurality of blocks 30 and associated elements 32 are arranged in confronting relationship to the facing elements 26 and the fixed portion 22 of the sheet anchor so that the wooden facing elements 26 and 32 define jaws initially spaced apart to receive the outer margin of the cover 10. The movable and fixed portions of the sheet anchor are then moved together to clamp the edge of the cover 10 therebetween by operating a plurality of nut and bolt assemblies, one of which is illustrated at 34 in FIG. 4. With the provision of the continuous sheet anchor 18, it will be apparent that the cover 10 may be quickly installed without having to remove any of the water from the reservoir and without having to make any special anchorages or provisions for anchorages in the bottom or sides of the reservoir. In addition, a fluid-tight relationship is provided between the cover 10 and the periphery of the reservoir.

In order to obtain access to the underside of the cover 10 and the interior of the reservoir, four flaps 36 are provided at the four corners of the cover 10, each flap 36 being defined by a right angular cut in the cover 10, suitably strengthened by reinforcing strips and secured in closed position by lacing 38 or the like.

The cover 10 is floated or buoyed upon the surface of the stored water by a plurality of float units 40 so that in the event that the cover 10 is accidentally torn, it is prevented from sinking to the bottom of the reservoir and thereby complicating repair of the cover. The cover 10 could also be floated by employing the float arrangement of FIGS. 9–12, as will subsequently be described, or the cover 10 could itself be made floatable by making it of a material such as foamed plastic having positive buoyancy and characterized by marginal flexible portions of the neutral or negative buoyancy. However, utilization of the float units 40 is preferable where it is desired to drain water from the cover 10 from a number of different points over the surface thereof.

Each float unit 40 is made of butyl rubber and is provided with an inflation valve 43 extending above the surface of the cover 10. That is, each float unit is affixed to the underside of the cover by three straps 42 secured to the underside of the cover by a plurality of suitable fasteners 44, the inflation valve 43 for each float unit extending upwardly through a suitable opening in the cover so that the unit may be easily inflated or deflated.

The float units 40 are preferably arranged in substantially uniformly distributed sets of four, the four units of each set being oriented to define a rectangular bay 41 or unsupported area therebetween. With this arrangement, rain water tends to collect in the unsupported areas defined by the sets of float units, making it possible to pump or otherwise drain this water off the surface of the cover by pumping from each bay 41, as will be seen.

In addition, it is particularly noted that the float units 40 are spaced away from the outer periphery of the cover 10 to define an unsupported peripheral area constituting an expansion and drainage section or sump, which is designated in FIG. 1 by dash-dot lines extending about the periphery of the cover 10 and identified by the numeral 46.

The area of the sump 46 is completely unsupported by float units so that the excess material in the cover tends to develop the folds 16. Then, as rain water collects upon the surface of the cover, the rain water tends to flow to the lower, unsupported areas of the cover, comprising both the bays 41 and the sump 46. The water in the sump 46 forces the folds 16 more deeply into the stored water as the volume of rain water increases. Drainage of the rain water to the sump 46 may be increased by selectively inflating the float units 40 so that the more interiorly disposed float units ride higher on the reservoir water cause the rain water to flow exteriorly or outwardly into the sump 46.

In certain applications water collection in the area of the sump 46 is sufficient without resorting to the inflatable float units 40, and in these instances an arrangement like that illustrated in FIGS. 9–12 can be used, as will be more particularly described hereinafter.

A plurality of flexible drain lines 48 are arranged to extend across the cover 10 as best illustrated in FIG. 1, and are each provided with inlet openings 50 in communication with the unsupported bays 41 defined by each set of the float units 40. One extremity of each of the drain lines 48 is capped or closed, as at 49, and the opposite extremities of the lines are connected to a manifold drain line 52 extending transversely of the lines 48 at one end of the reservoir. In addition, a continuous sump drain line 54, normally located at a level below that of the line 52, extends about the periphery of the cover and is provided along its length with openings (not shown) in communication with the sump 46.

The manifold line 52, as best illustrated in FIG. 2, is connected by a flexible drain line 56 to a drain conduit 58 secured by a bracket 59 to the facing element 32 in the berm 20 of the reservoir. The drain conduit 58 is made of a length sufficient that it will reach the manifold line 52 at the lowest level to which the water in the reservoir falls. The drain conduit 58 is connected to any suitable pump or drainage means (not shown) whereby the rain water collected in the bays 41 can easily be removed.

The sump drain line 54 is connected by a flexible drain line 60 to a drain conduit 61 which is located alongside the drain line 56 and is connected to the facing element 32 by the same bracket 59 which secures the drain conduit 58. Like the flexible line 56, the line 60 is made of a length sufficient that it will reach the sump line 54 at its lowest level within the fold 16 defining the sump 46. The drain conduit 61 is connected to the same pump or drainage means (not shown) to which the drain conduit 58 is connected so that the pump can take a suction on either or both of the conduits, as will be apparent to those skilled in the art.

The cover 10 is constrained against lateral movement, as might occur by virtue of a wind sweeping across the surface of the reservoir, by a plurality of anchors 62 resting upon the bottom of the reservoir. Each anchor 62 is connected to the cover by a flexible line 64 made of a length sufficient to accommodate the rise and fall of the cover 10 during use of the reservoir, the upper end of each line 64 being secured to a fitting 66 which is adhered or otherwise secured to a reinforced section 68 of the cover 10.

Referring now to FIGS. 9 through 12, there is illustrated another cover in accordance with the present invention, designated generally by the numeral 70. The cover 70 is in many respects similar to the cover 10 previously described, but is characterized by a different arrangement of floats, a different form of sheet anchorage, and an added provision for support of the cover during repair and maintenance of the reservoir.

More particularly, the cover 70 is rectangular in configuration and made of thin butyl rubber sheeting or the like which completely overlies the water in the reservoir. The size of the cover 70 is greater than the area of the reservoir at its upper periphery so that the folds 16 are formed at the outer margin of the cover 70, as was the case with the cover 10. The cover 70 is fabricated by securing together a plurality of elongated strips of the cover material, the seams between such strips being best illustrated in FIG. 11. The adjacent margins of the cover strips are arranged to form a lap joint and any suitable adhesive 72 is interposed between the lap portions of the strips to secure them together.

Figure 10:
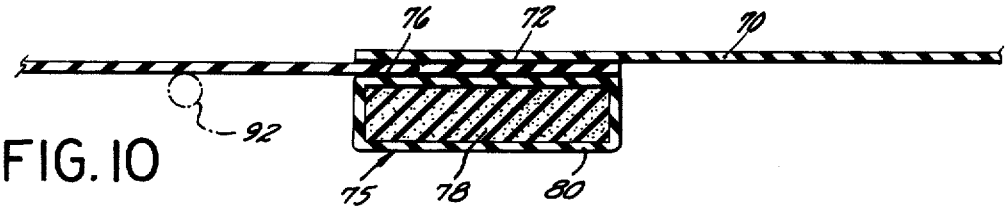
FIG. 10 is an enlarged view taken along the line 10—10 of FIG. 9.
Figure 11:
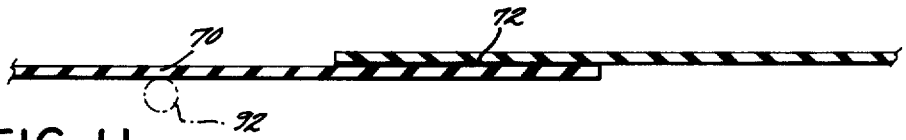
FIG. 11 is an enlarged view taken along the line 11—11 of FIG. 9.

A plurality of elongated floats 74 and 75 are secured to the underside of the cover 70, as best illustrated in FIGS. 9 and 10, by a suitable adhesive 76. The floats 74 extend perimetrically along the sides and ends of the cover 70 in a rectangular configuration and, in one embodiment, are approximately 12 inches wide. Each float 74 is elongated and abuts the adjacent floats at its ends. Each float 74 and 75 includes a central portion 78 made of buoyant material such as one of the well known plastic or rubber foam materials, and also includes an outer casing 80 made of butyl rubber and completely enveloping the portion 78.

The peripheral band of floats 74 are spaced from the edge margin of the cover 70 and define the unsupported sump portion 46 between the marginal floats and the edge of the cover 70. In addition, the plurality of floats 75, preferably of lesser width than the marginal floats 74, extend across the cover beneath each of the seams between the cover strips. Thus, the pattern of floats 74 is a rectangular perimeter of floats, the floats 75 constitute a plurality of strings of floats across the cover in parallel, spaced relationship to one another.

Rain water collects in the sump 46, as previously described in connection with the first embodiment, by forcing the folds 16 deeper into the water stored in the reservoir.

Figure 12:
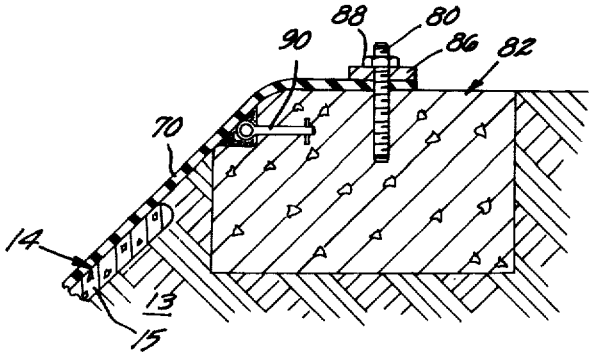
FIG. 12 is an enlarged view taken along the line 12—12 of FIG. 9.

Referring now to FIG. 12, the edge margins of the cover 70 are secured in position adjacent the berm of the reservoir in substantially fluid-tight relationship by a peripherally continuous concrete footing 82 firmly embedded in the subgrade 13. The footing 82 includes a plurality of equally spaced studs 84 embedded therein, and a plurality of elongated anchor elements 86 are arranged in end-abutting relationship along the length of the footing 82 and are each provided with suitable openings for receiving the upper ends of the studs 80. The margin of the cover 70 is also provided with similar openings for the studs 80 so that the cover may be secured in position by first disposing the margin thereof in position upon the studs 80 and thereafter placing the anchor elements 86 in position so that the cover 70 is sandwiched between jams constituted by the elements 86 and the upper surface of the footing 82. A plurality of nuts 88 are then threaded upon the plurality of studs 80 to firmly secure the cover 70 in position.

With the arrangement just described, no provision need be made for pumping rain water from the central portions of the cover. Rather, the arrangement of floats 74 has been found to float the cover high enough in the reservoir water that rain water can drain into the sump 46 for removal by any suitable pump (not shown). Thus, the sump 46 can be drained merely by disposing a flexible drain line in any portion of the sump and taking a suction until the collected water is removed, as will be apparent.

The footing 82 also includes a plurality of peripherally spaced and embedded I-bolts 90, each I-bolt on one side of the reservoir having its counterpart located in the confronting footing 82 on the opposite side of the reservoir. With this arrangement supporting cables 92, indicated in dash-dot outline in FIGS. 10 and 11 can be disposed beneath the cover 70 and connected at their opposite extremities of the I-bolts 90. The cables 92 thus extend beneath the cover in parallel relationship, as indicated by the parallel dash-dot lines 94 in FIG. 9, so that when it is desired to repair the bottom or side walls of the reservoir, the stored water can be emptied and the cover 70 supported or suspended above the reservoir floor. The cables 92 may be installed beneath the cover and attached to the I-bolts 90 when the cover is first installed, if sufficient slack is provided in the cables to permit the cover to rise and fall with the change in level of the stored water, or the cables may be installed only when it is desired to empty the reservoir. In this case, skin divers can easily install the cables in their proper positions. Although not shown, the underside of the cover 70 in the area of the cables is preferably suitably reinforced by adhesively securing an extra thickness of butyl sheeting, thereby reducing possible abrading of the underside of the cover by the cables 92.

From the foregoing it will be apparent that a floating cover has been provided which is adapted to not only accommodate itself to the rise and fall of the water level in a reservoir, but which is also adapted to define a sump area adjacent the periphery of the reservoir for the collection of rain water whereby the rain water may be easily pumped away or otherwise removed. In addition, the cover completely overlies the water in the reservoir and prevents contamination of the water by deleterious substances or by small animals and birds.

Various modifications and changes may be made with regard to the foregoing detailed description without departing from the spirit of the invention or the scope of the following claims.

We claim:

1. A floating cover for a liquid storage reservoir wherein the level of the stored liquid varies, said cover comprising:

a continuous sheet of flexible material impervious to and adapted to completely overlie the liquid in the storage reservoir in coextensive relationship to the reservoir periphery for attachment thereto, the area and flexibility of said sheet permitting formation of depending folds in said sheet;

a plurality of anchors adapted to rest upon the bottom of said reservoir;

a plurality of flexible lines connecting said anchors to various portions of said sheet to constrain said sheet against lateral movement over the surface of the stored liquid;

and flotation means on said sheet interiorly of the outer periphery thereof for supporting said sheet upon the surface of the stored liquid whereby said depending folds tend to define a sump section adjacent the outer periphery of said sheet, rain water tending to collect in said depending folds and force said folds deeper into the stored liquid as the volume of rain water increases.

2. In combination with a liquid storage reservoir wherein the level of the stored liquid varies, a floating cover comprising:

a continous sheet of flexible material impervious to and adapted to completely overlie said liquid in coextensive relationship to the reservoir periphery, the area of said sheet being greater than the area of said reservoir at the upper extremity thereof whereby depending folds are formed in said sheet;

fastening means for securing the outer periphery of said sheet adjacent the reservoir periphery;

a plurality of sets of individually inflatable float units attached to said sheet in spaced relationship across said sheet interiorly of the outer periphery thereof for supporting said sheet upon the surface of the stored liquid whereby said depending folds form adjacent the outer periphery of said sheet and define a sump section, rain water tending to collect in said depending folds each said set of float units defining an unsupported area of said sheet therebetween;

and drain lines extending across said sheet and having inlet openings in communication with said sump section and with each said unsupported area, and further having a discharge portion adapted for connection to a pump, said float units being adapted for individual inflation whereby rain water tends to flow away from the more highly inflated ones of said float units and into said unsupported areas adjacent the less inflated ones of said float unit.

3. In conbination:

a liquid storage reservoir having sloping side walls and a peripheral berm;

anchor means located about the periphery of said reservoir adjacent said berm and including fixed and movable portions constituting jaws, and further including means for urging said jaws closed;

a continuous sheet of flexible material impervious to and adapted to completely overlie the liquid in the storage reservoir in coextensive relationship to the reservoir berm, the area and flexibility of said sheet permitting formation of depending folds in said sheet, the peripheral edges of said sheet being disposed between said jaws and firmly held thereby in the closed position thereof;

a plurality of anchors adapted to rest upon the bottom of said reservoir;

a plurality of flexible lines connecting said anchors to various portions of said sheet to constrain said sheet against lateral movement over the surface of the stored liquid;

and flotation means on said sheet interiorly of the outer periphery thereof for supporting said sheet upon the surface of the stored liquid whereby said depending folds tend to define a sump section adjacent the outer periphery of said sheet, rain water tending to collect in said depending folds and force said folds deeper into the stored liquid as the volume of rain water increases.

4. In combination:

a liquid storage reservoir having sloping side walls and a peripheral berm;

anchor means located about the periphery of said reservoir adjacent said berm and including fixed and movable portions constituting jaws, and further including means for urging said jaws closed, said anchor means mounting a plurality of cable mounts;

a continuous sheet of flexible material impervious to and adapted to completely overlie the liquid in the storage reservoir in coextensive relationship to the reservoir berm, the area and flexibility of said sheet permitting formation of depending folds in said sheet, the peripheral edges of said sheet being disposed between said jaws and firmly held thereby in the closed position thereof;

flotation means on said sheet interiorly of the outer periphery thereof for supporting said sheet upon the surface of the stored liquid whereby said depending folds tend to define a sump section adjacent the outer periphery of said sheet, rain water tending to collect in said depending folds and force said folds deeper into the stored liquid as the volume of rain water increases;

and a plurality of cables extending between said cable mounts and beneath said sheet in positions to support said sheet in the absence of liquid in said reservoir.

5. Apparatus for preventing contamination of the stored liquid in an open reservoir, comprising:

a continuous sheet of flexible, relatively thin material impervious to and completely overlying said liquid in coextensive relationship to the periphery of said reservoir, the size of said sheet being greater than the area encompassed by the upper periphery of said reservoir;

anchor means securing the outer periphery of said sheet to the upper periphery of said reservoir in fluid-tight relationship therewith;

and float means on said sheet spaced inwardly from the upper periphery of said reservoir to raise and lower said sheet on the surface of said liquid as the level thereof varies, with said float means supporting the area of said sheet engaged by said float means at a higher elevation than the *peripheral* portion of said sheet spaced outwardly of said float means and inwardly of said anchor means whereby said *peripheral* portion forms a depending rainwater collection sump, *said float means comprising a plurality of float units arranged across the central portion of said sheet bounded by said peripheral portion, at least some of said float units being spaced apart to define paths for rain water to flow from said central portion toward said peripheral portion, said peripheral portion being unsupported by said float means whereby said peripheral portion is adapted to sink below the level of said central portion of said sheet to form said sump.*

*6. Apparatus for preventing contamination of the stored liquid in an open reservoir, comprising:*

*a continuous sheet of flexible, relatively thin material impervious to and completely overlying said liquid in coextensive relationship to the periphery of said reservoir, the size of said sheet being greater than the area encompassed by the upper periphery of said reservoir;*

*anchor means securing the outer periphery of said sheet to the upper periphery of said reservoir in fluid-tight relationship therewith;*

*and float means on said sheet spaced inwardly from the upper periphery of said reservoir to raise and lower said sheet on the surface of said liquid as the level thereof varies, with said float means supporting the area of said sheet engaged by said float means at a higher elevation than the peripheral portion of said sheet spaced outwardly of said float means and inwardly of said anchor means whereby said peripheral portion forms a depending rainwater collection sump, said float means comprising a plurality of float units arranged in a pattern across the entire central portion of said sheet bounded by said peripheral portion, at*

*least some of said float units being spaced apart to define paths for rain water to flow from said central portion toward said peripheral portion, said peripheral portion being unsupported by said float means whereby said peripheral portion is adapted to sink below the level of said central portion of said sheet to form said sump in response to the weight of rain water collecting on said peripheral portion.*

*7. Apparatus for preventing contamination of the stored liquid in an open reservoir, comprising:*

*a continuous sheet of flexible, relatively thin material impervious to and completely overlying said liquid in coextensive relationship to the periphery of said reservoir, the size of said sheet being greater than the area encompassed by the upper periphery of said reservoir;*

*anchor means securing the outer periphery of said sheet to the upper periphery of said reservoir in fluid-tight relationship therewith;*

*and float means on said sheet spaced inwardly from the upper periphery of said reservoir to raise and lower said sheet on the surface of said liquid as the level thereof varies, with said float means supporting the area of said sheet engaged by said float means at a higher elevation than the peripheral portion of said sheet spaced outwardly of said float means and inwardly of said anchor means whereby said peripheral portion forms a depending rainwater collection sump, said peripheral portion normally being empty of any liquid whereby it is adapted to receive and collect rain water and sink below the level of said central portion of said sheet to form said sump.*

*8. Apparatus for preventing contamination of the stored liquid in an open reservoir, comprising:*

*a continuous sheet of flexible, relatively thin material impervious to and completely overlying said liquid in coextensive relationship to the periphery of said reservoir, the size of said sheet being greater than the area encompassed by the upper periphery of said reservoir;*

*anchor means securing the outer periphery of said sheet to the upper periphery of said reservoir in fluid-tight relationship therewith;*

*and float means on said sheet spaced inwardly from the upper periphery of said reservoir to raise and lower said sheet on the surface of said liquid as the level thereof varies, with said float means supporting the area of said sheet engaged by said float means at a higher elevation than the peripheral portion of said sheet spaced outwardly of said float means and inwardly of said anchor means whereby said peripheral portion forms a depending rainwater collection sump, said float means comprising a plurality of elongated floats, arranged in a plurality of strings extending across the central portion of said sheet bounded by said peripheral portion, said strings being disposed in parallel, spaced relationship to one another, to define paths for rain water to flow from said central portion toward said peripheral portion, said peripheral portion being unsupported by said float means whereby said peripheral portion is adapted to sink below the level of said central portion of said sheet to form said sump.*

*9. Apparatus for preventing contamination of the stored liquid in an open reservoir, comprising:*

*a continuous sheet of flexible, relatively thin material impervious to and completely overlying said liquid in coextensive relationship to the periphery of said reservoir, the size of said sheet being greater than the area encompassed by the upper periphery of said reservoir;*

*anchor means securing the outer periphery of said sheet to the upper periphery of said reservoir in fluid-tight relationship therewith;*

*and float means on said sheet spaced inwardly from the upper periphery of said reservoir to raise and lower said sheet on the surface of said liquid as the level thereof varies, with said float means supporting the area of said sheet engaged by said float means at a higher elevation than the peripheral portion of said sheet spaced outwardly of said float means and inwardly of said anchor means whereby said peripheral portion forms a depending rainwater collection sump, said peripheral portion being unweighted and unsupported by said float means, whereby said peripheral portion is adapted to sink below the level of said central portion of said sheet to form said sump solely in response to the weight of rain water collecting on said peripheral portion.*

*10. Apparatus for preventing contamination of the stored liquid in an open reservoir, comprising:*

*a continuous sheet of flexible, relatively thin material impervious to and completely overlying said liquid in coextensive relationship to the periphery of said reservoir, the size of said sheet being greater than the area encompassed by the upper periphery of said reservoir;*

*anchor means securing the outer periphery of said sheet to the upper periphery of said reservoir in fluid-tight relationship therewith;*

*and float means on said sheet spaced inwardly from the upper periphery of said reservoir to raise and lower said sheet on the surface of said liquid as the level thereof varies, with said float means supporting the area of said sheet engaged by said float means at a higher elevation than the peripheral portion of said sheet spaced outwardly of said float means and inwardly of said anchor means whereby said peripheral portion forms a depending rainwater collection sump, said float means comprising a plurality of float units arranged in a pattern across the entire central portion of said sheet bounded by said peripheral portion, at least some of said float units being spaced apart to define paths for rain water to flow from said central portion toward said peripheral portion, said peripheral portion being unsupported by said float means and normally empty of any liquid whereby it is adapted to receive and collect rain water and sink below the level of said central portion of said sheet to form said sump, said peripheral portion being unweighted whereby only the weight of rain water collecting on said peripheral portion is operative to form said sump.*

* * * * *